United States Patent
Shin (10) Patent No.: US 10,433,500 B2
(45) Date of Patent: Oct. 8, 2019

(54) ROTATING EJECTION TYPE OOZING HOSE FOR PLANT CULTIVATION

(71) Applicant: Sungsoon Shin, Suwon-si (KR)

(72) Inventor: Sungsoon Shin, Suwon-si (KR)

( * ) Notice: Subject to any disclaimer, the term of this patent is extended or adjusted under 35 U.S.C. 154(b) by 0 days.

(21) Appl. No.: 15/513,728

(22) PCT Filed: Apr. 27, 2016

(86) PCT No.: PCT/KR2016/004392
§ 371 (c)(1),
(2) Date: Mar. 23, 2017

(87) PCT Pub. No.: WO2016/186333
PCT Pub. Date: Nov. 24, 2016

(65) Prior Publication Data
US 2018/0103595 A1 Apr. 19, 2018

(30) Foreign Application Priority Data

May 19, 2015 (KR) .................. 20-2015-0003183
May 19, 2015 (KR) .................. 20-2015-0003184

(51) Int. Cl.
*A01G 25/02* (2006.01)
*B05B 1/20* (2006.01)
*B05B 1/34* (2006.01)

(52) U.S. Cl.
CPC .......... *A01G 25/02* (2013.01); *A01G 25/023* (2013.01); *B05B 1/20* (2013.01); *B05B 1/202* (2013.01); *B05B 1/3421* (2013.01); *B05B 1/3436* (2013.01)

(58) Field of Classification Search
CPC .......... B05B 1/20; B05B 1/202; B05B 1/341; B05B 1/3421; B05B 1/3436; B05B 1/3447; A01G 25/02; A01G 25/023
See application file for complete search history.

(56) References Cited

U.S. PATENT DOCUMENTS 3,753,527 A * 8/1973 Galbraith ............. A01G 25/023
239/11
3,782,629 A * 1/1974 Hruby, Jr. .............. B05B 17/08
239/17
(Continued)

FOREIGN PATENT DOCUMENTS

EP          0327232        8/1989
JP          S51-107644     9/1976
(Continued)

OTHER PUBLICATIONS

English Abstract of S56-037066.
(Continued)

*Primary Examiner* — Ryan A Reis
(74) *Attorney, Agent, or Firm* — Antonio Ha & U.S. Patent, LLC (57) ABSTRACT

A rotating ejection type oozing hose comprises a rotation generator formed at an ejection opening at an interval along a longitudinal direction of a hose, applying a rotational force to a flow of water from an inner space of the hose to an outer space. The rotation generator comprises a barrel-shaped rotating space extended from the ejection opening and formed inside the hose. The rotating space is defined by a side portion formed to be extended from an inner of the hose and having a rotational force applying passage horizontally connecting the inner space of the hose to the rotating space and a bottom portion for closing a lower end of the side portion. The rotational force applying passage faces a point deviating from a center portion of the rotating space, applying a rotational force to water flowing into the rotating space through the rotational force applying passage.

8 Claims, 11 Drawing Sheets

(56) References Cited

U.S. PATENT DOCUMENTS

| | | | | |
|---|---|---|---|---|
| 4,369,923 A | * | 1/1983 | Bron | B05B 1/3006 |
| | | | | 239/533.1 |
| 4,430,020 A | * | 2/1984 | Robbins | A01G 25/02 |
| | | | | 405/43 |
| 4,817,875 A | * | 4/1989 | Karmeli | A01G 25/023 |
| | | | | 239/542 |
| 4,872,513 A | * | 10/1989 | Gardner | A62C 3/00 |
| | | | | 169/57 |
| 5,951,882 A | | 9/1999 | Simmons | |

FOREIGN PATENT DOCUMENTS

| | | |
|---|---|---|
| JP | S56-037066 | 4/1981 |
| JP | S57-36863 | 7/1982 |
| JP | 2004-16918 | 1/2004 |
| JP | 2009-119562 | 6/2009 |
| KR | 10-2005-0122084 | 12/2005 |
| KR | 20-0411174 | 3/2006 |
| KR | 10-0761493 | 10/2007 |
| KR | 10-1381184 | 4/2014 |
| KR | 10-1451682 | 10/2014 |

OTHER PUBLICATIONS

English Abstract of 2004-16918.
English Abstract of 2009-119562.
English Abstract of S57-36863.
English Abstract of S51-107644.
English translation of 20-0411174.
English translation of 10-1451682.
English translation of 10-2005-0122084.
English translation of 10-1381184.
English translation of 10-0761493.

* cited by examiner

Fig. 13 ations filed on Apr. 27, 2016, which claims priority under 35 U.S.C.
ROTATING EJECTION TYPE OOZING HOSE FOR PLANT CULTIVATION

CROSS-REFERENCE TO RELATED APPLICATIONS

This patent application is a national-stage application of International Patent Application No. PCT/KR2016/004392 filed on Apr. 27, 2016, which claims priority under 35 U.S.C. § 119 to Korean Patent Applications No. 20-2015-0003183, filed on May 19, 2015 and No. 20-2015-003184, filed on May 19, 2015, in the Korean Intellectual Property Office, the disclosure of which is incorporated by reference herein in its entirety.

TECHNICAL FIELD

The present invention relates to an oozing hose for supplying water to plant or soil for plant cultivation, and particularly to, a rotating ejection type oozing hose for plant cultivation, including a rotation generator for applying a rotational force to water introduced through an inner space of the hose, and thus the water is dispersed in a wider area when discharged through an outlet.

DISCUSSION OF RELATED ART

Irrigation hoses for plant cultivation have drip hoses and oozing hoses. The drip hoses continuously drip a small amount of water to be sprayed. The oozing hoses have outlets with a diameter of about 0.3 mm to about 1 mm and thus eject water in the form of mist or drizzle through the ejection openings. Drip hoses or oozing hoses can be optionally used depending on plant types or cultivation types. Drip hoses for continuously wetting soil planted with plants generally include filtration devices and decompression devices to significantly reduce the ejection rate of water that comes out through outlets, and thus water droplets are formed on the ejection openings and falls to be spewed when the diameter of the droplets increases. On the other hand, the oozing hoses as shown in FIG. 11 are generally used, for spraying water, evenly on broad leaves of plants with large leaves, such as a foliage plant or for evenly wetting a large area of the soil at once.

Meanwhile, instead of the oozing hoses, a large area be irrigated using sprinklers, however since they may include rotating devices having a rotating motion in practice, it is practically uneconomical to install the devices at each ejection opening of the hose. Additionally, since a stream of the spouted water is thick, the ground may cave in or the leaves of the plants may be damaged.

Figure 11:
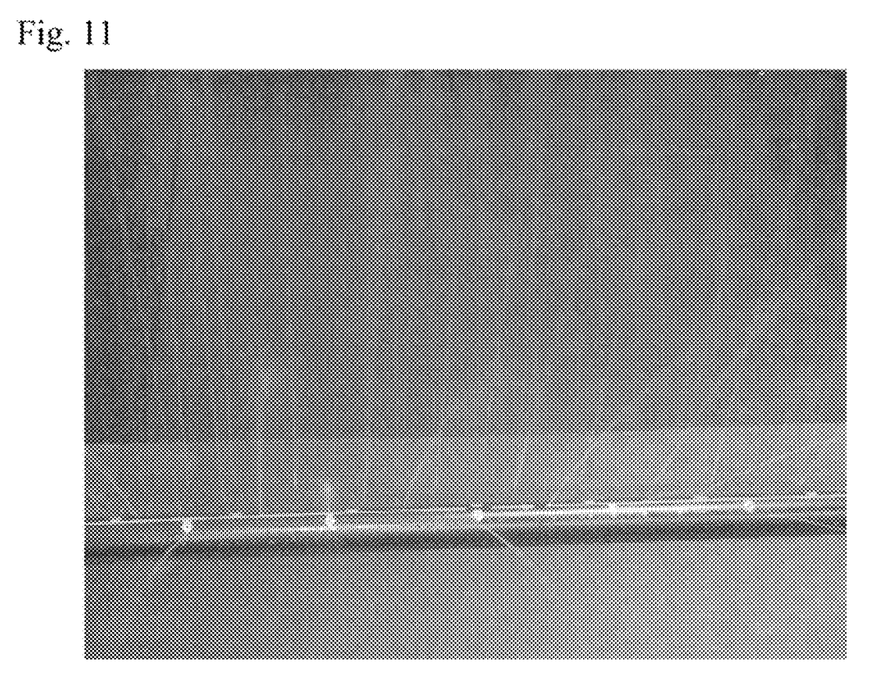
FIG. 11 illustrates a water stream ejected from a conventional oozing hose.

According to a conventional oozing hose shown in FIG. 11, the water in the hose is linearly ejected to the outside through the ejection openings, and thus drops to the ground. The effect of dispersing the water stream is very low until the water ejected from the outlet of the hose falls and reaches the ground. Thus, in order to spray water evenly over plants distributed in a large area, it is required to increase the number of the outlets or to narrow the diameter of the outlets.

However, when the number of the outlets increases, a pressure of water passing through the outlet of a hose having a certain length becomes weak toward the direction in which the water travels along with the outlets. Accordingly, the water cannot be uniformly supplied to the plants corresponding to the entire length of the hose. In addition, when the diameter of the outlets is made narrow and the water pressure for the entire hose is maintained, since the jetted water reaches the plants at a short distance, and the diameter of the water stream is small, thus the spraying area of the water with respect to the length of the unit hose is so small that the entire area of the plants may not be wetted or an outlet with a narrow diameter is easily clogged by foreign matters.

Accordingly, the present inventors provide an oozing hose having a new structure capable of uniformly spraying water over a wide range without increasing the number of ejection openings and reducing the diameter of the ejection openings in the oozing hose.

SUMMARY

An object of the present invention is to provide a rotating ejection type oozing hose for plant cultivation, applying a rotational force to a water stream ejected from an ejection opening of a hose, allowing the water to be sprayed while sufficiently dispersed to cover a large area of the ground on which the plants are planted, so as to supply water evenly to the plants.

Another object of the present invention is to provide a rotating ejection type oozing hose for plant cultivation, which includes a rotation generator in the form of one chip attached to an inner surface of a hose at each of ejection openings.

Still another object of the present invention is to provide a rotating ejection type oozing hose for plant cultivation, which comprise a band-type rotation generating part having a plurality of the rotation generators formed in a row on one band, and of which an upper surface of a side portion of the rotation generator is attached to the inner surface.

Still another object of the present invention is to provide a rotating ejection type oozing hose for plant cultivation, which comprises a protruding rib formed to protrude along the longitudinal direction of the hose main body and including an upper rib and the rotation generator.

Additional objects of the present invention can be achieved by the detailed description of the present invention described with reference to accompanying drawings.

To achieve such objects, a rotating ejection type oozing hose for plant cultivation according to the present invention comprises the rotation generator 200 formed at an ejection opening 102 formed at an interval along a longitudinal direction of a hose 100, applying a rotational force to a flow of water ejected from an inner space 104 of the hose 100 to an outer space 106 thereof. The rotation generator 200 comprises a barrel-shaped rotating space 212 extended from the ejection opening 102 and formed inside the hose 100 The rotating space 212 is defined by a side portion 210 and a bottom portion 240, the side portion 210 formed to be extended from an inner wall of the hose 100 and having a rotational force applying passage 214 horizontally connecting the inner space 104 of the hose 100 to the rotating space 212, and the bottom portion 240 for closing a lower end of the side portion 210. The rotational force applying passage 214 is oriented to face a point deviating from a center portion P of the rotating space 212, applying a rotational force to a flow of water flowing into the rotating space 212 through the rotational force applying passage 214.

The rotation generator 200 may further comprise a filter 220 provided with a filtering hole 222 for filtering water flowing into the rotational force applying passage 214 from the inner space 104.

The rotation generator 200 may further comprise an ascending force reinforcement protrusion 230 formed on the bottom portion 240 corresponding to the center portion of the rotating space 212, more reinforcing an ascending force of water ascending to the election opening 102 while rotating in the inner space 212.

Further, in a rotating ejection type oozing hose for plant cultivation according to an embodiment of the present invention, the rotation generator 200 is formed in a chip-shape to be attached to an inner surface of the hose 100 at each of ejection openings 102.

Herein, two or more rotational force applying passages 214 are formed to be oriented in the same rotational direction at a predetermined interval therebetween with respect to the central portion of the rotational space 212.

Further, in a rotating ejection type oozing hose according to an embodiment of the present invention, a plurality of the rotation generator 200 are formed in a line in one band, and wherein an upper surface of the side portion 210 of each rotation generator 200 is formed to be attached to an inner surface of the hose 100.

Herein, the rotating ejection type oozing hose for plant cultivation may further comprise a decompressor 250 having at least one bending path for adjusting a pressure of water flowing into the rotational force applying passage 214.

Further, a rotating ejection type oozing hose for plant cultivation according to an embodiment of the present invention comprises a hose body 1000 having a cylindrical shape and a protruding rib 2000 protruding from a surface of the hose body 1000 to an outside thereof along a longitudinal direction of the hose body 1000. The protruding rib 2000 comprises an upper rib 2100 provided with an ejection opening 1002 formed at an interval along a longitudinal direction of the protruding rib 2000 and a rotation generator 2200 formed at the ejection opening 1002 for applying a rotational force to a flow of water ejected from an inner space 1004 of the hose body 1000 to an outer space 1006 thereof. The rotation generator 2200 comprises a barrel-shaped rotating space 2012 extended from the ejection opening 1002 and formed inside the upper rib 2100. The rotating space 2012 is defined by a side portion 2210 and a bottom portion 2240, the side portion 2210 formed to be extended from an inner wall of the upper rib 2100 and having a rotational force applying passage 2014 which is a horizontal passage to supply water flowing into an inner space 1004 of the hose body 1000 to rotating space 2012, and the bottom portion 2240 for closing a lower end of the side portion 2210. The rotational force applying passage 2044 is oriented to face a point deviating from a center portion P of the rotating space 2042, supplying a rotational force to a flow of water flowing into the rotating space 2012 through the rotational force applying passage 2014.

Herein, the rotation generator 2200 may further comprise a filter 2020 provided with a filtering hole 2022 for filtering water flowing into the rotational force applying passage 2014 from the inner space 1004.

Further, the rotation generator 2200 may further comprise an ascending force reinforcement protrusion formed on the bottom portion 2240 corresponding to the center portion of the rotating space 2012, more reinforcing an ascending force of water ascending to the ejection opening 1002 while rotating in the rotating space 2012.

According to such rotating ejection type oozing hose for plant cultivation of the present invention, the rotational force is applied to the water stream ejected at the ejection opening by the rotation generator formed on the ejection opening so that the water is fallen and distributed into a large area while rotated, and thus the plant is wetted. Accordingly, the dispersed area of the water is maximized while the number of the ejection openings is minimized, and thus the water pressure of the water stream ejected from each of the ejection openings can be evenly maintained. Further, by rotating the water, the diameter of the water particles is dispersed while being formed to be small and uniform. Thus, when the water falls on the plant or the soil, the leaves of the plant can be evenly wetted, and the soil can be irrigated without cave-in while minimizing the impact caused by the water load.

BRIEF DESCRIPTION OF THE DRAWINGS

FIG. 12(a) shows a configuration in which the rotational force applying passage is oriented toward a point near a center of a rotating space and FIG. 12(b) shows a configuration in which the rotational force applying passage is oriented toward a point near an edge of the rotating space.

DETAILED DESCRIPTION OF EXEMPLARY EMBODIMENTS

Hereinafter, preferred embodiments of the present invention will be described in detail with reference to accompanying drawings. The terms and words used in the present specification and claims should not be construed as limited to ordinary or dictionary meanings and should be construed as meanings or concepts consistent with the technical specifications of the present invention.

Figure 1:
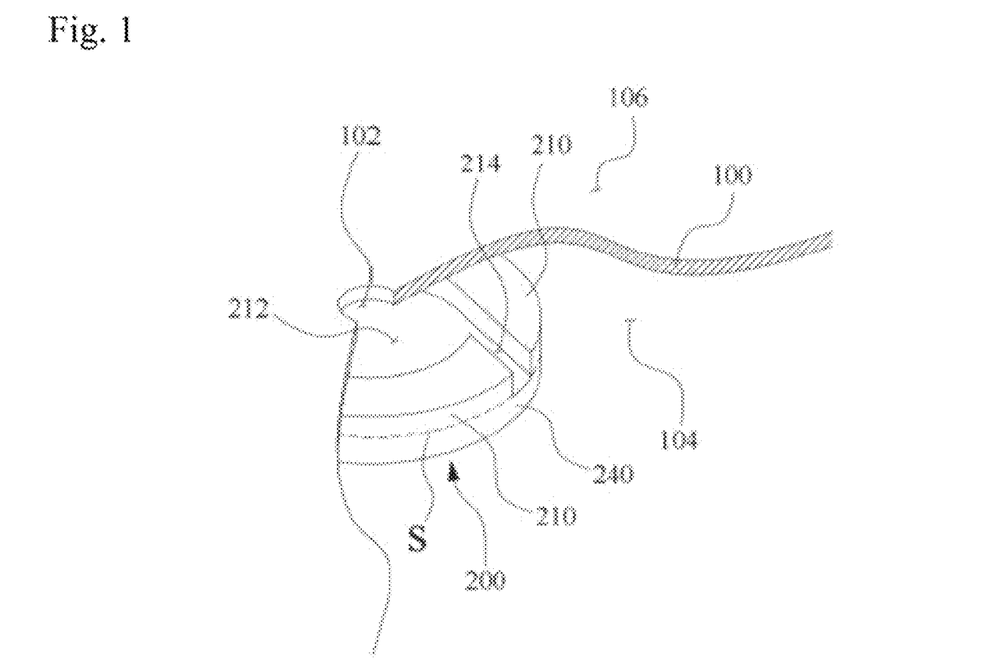
FIG. 1 is a partially sectioned perspective view schematically illustrating the concept of a rotating ejection type oozing hose for plant cultivation of the present invention.
Figure 2:
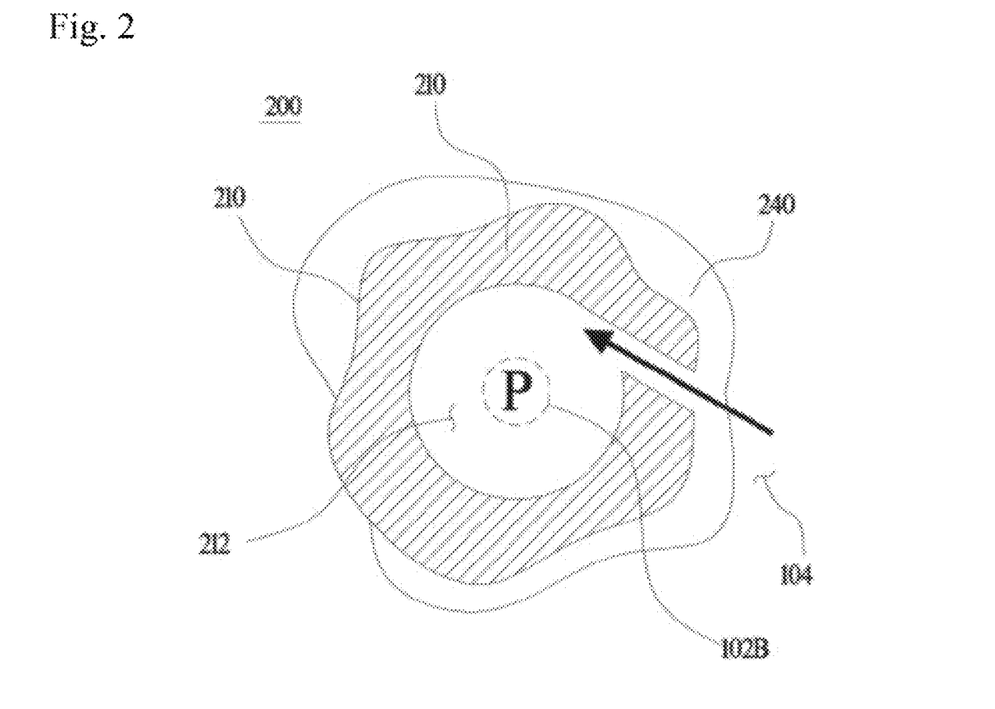
FIG. 2 is a plain view illustrating an embodiment showing a configuration of a rotation generator of a rotating ejection type oozing hose for plant cultivation of the present invention.
Figure 3:
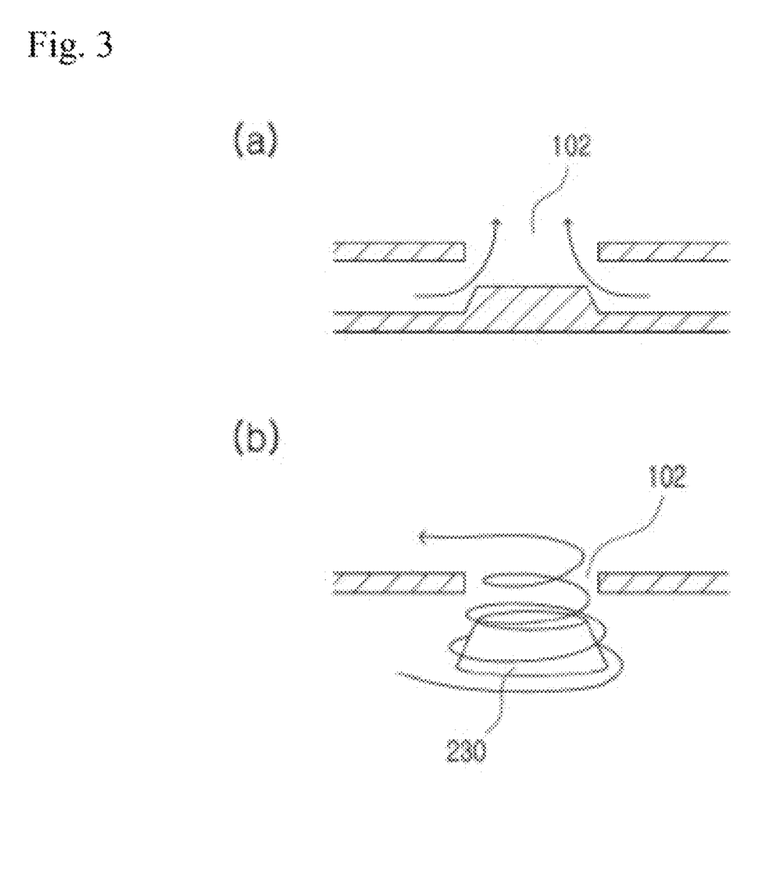
FIG. 3 shows a cross-sectional view (a) and a perspective view (b) illustrating a state in which an ascending force reinforcement projection is formed at a central portion of a rotating space of a rotation generator according to one embodiment of the present invention.

FIG. 1 is a partially sectioned perspective view schematically illustrating the concept of a rotating ejection type oozing hose for plant cultivation of the present invention. FIG. 2 is a plan view illustrating an embodiment showing a configuration of a rotation generator of a rotating ejection type oozing hose for plant cultivation of the present invention. Referring to FIGS. 1 and 2, in contrast with a commonly conventional oozing hose shown in FIG. 11, a rotating ejection type oozing hose for plant cultivation according to an embodiment of the present invention is configured to include the rotation generator 200 installed on an ejection opening 102 of a hose 100, allowing water to be rotatably ejected from the ejection opening 102.

In other words, the rotation generator 200 is formed at the ejection opening 102 formed at an interval along the longitudinal direction of the hose 100 and applies a rotational force to a flow of water ejected from an inner space 104 of the hose 100 to an outer space 106 thereof. The hose 100 may be made, of a variety of soft materials such as a synthetic resin material of a general soft rubber material, which can expand to be formed into a circular shape in section when the inner space of the hose is filled with water. Since a function of an oozing hose is properly performed, the diameter thereof at inflation is preferably about 30 mm to about 50 mm.

Specifically, the rotation generator 200 includes a tube-type rotating space 212 extended from the ejection opening 102 and formed on an inner surface of the hose 100, and generates a rotating current in the water flowing into the rotating space 212 in the inner space 104 of the hose 100. The rotating space 212 is preferably formed in a substantially cylindrical shape in order to generate a constant rotation current with respect to a central portion P of the rotating space 212. If necessary, it however may take a form other than a cylinder. However, it is preferable not to include special protrusions or bumps that hinder a rotational flow of water.

Further, the rotating space 212 is a space in which a rotational force is applied to the inflow water to form a rotating current. The outer shape and size of the rotating space 212 are basically formed by a side portion 210 thereof and a bottom portion 240 thereof for closing a lower end of the side portion 210. In the figure, a boundary S between the side portion 210 and the bottom portion 240 is indicated by a dotted line.

The side portion 210 extends, from an inner wall of the hose 100 to the central portion P of the hose 100, The side portion 210 is provided with a rotational force applying passage 214 which is a horizontal path connected from the inner space 104 of the hose 100 to the rotating space 212. As shown in FIG. 2, a shape of the inner surface of the side portion 210 defines a shape of the outer surface of the rotating space 212. In FIG. 2, a dotted circle 102B surrounding P represents a position of an edge of the ejection opening 102.

Further, the rotational force applying passage 214 is necessarily formed to have a constant length and a constant width in a linear or curved shape so that the flow of water can be guided in a specific direction and maintained constant. When the rotational force applying passage 214 has a curved shape, although not shown, the curved shape matches the rotational direction of the water so that the rotational force is maximized.

In order to form an appropriate length of the rotational force applying passage 214, at least a portion of the side portion 210 is necessarily formed to have a thickness enough to form a sufficient length of the rotational force applying passage 214 or formed to project outwardly, and a width of the rotational force applying passage 214 may be determined in consideration of, e.g., a width and a length of the hose 100, strength of water pressure flowing into the hose, and thus the strength and dispersion range of the water pressure of the droplet ejected from the ejection opening 102 can be determined.

As a main element of the present invention, the rotational force applying passage 214 of the side portion 210 is oriented toward a point deviating from the central portion P of the rotating space 212, and thus the rotational force applying passage 214 applies a rotational force to a flow of the water flowing into the rotating space 212 so that water ejected through the ejection opening 102 is sufficiently dispersed while, rotating. Since the rotating space 212 is formed in a cylindrical shape having a predetermined height as described above, water traveling toward a point deviated from the center portion of the rotating space 212 rotates about a center portion corresponding to below the ejection opening 102.

Such rotational force of water is proportional to the degree of the orientation of the rotational force applying passage 214 away from the center portion. As a preferable embodiment in which the rotational force can be maximized, when the rotational force applying path 214 is formed in a direction in contact with the edge of the rotating space 212, the flow of water linearly or curvedly flowing through the rotational force applying passage 214, after entering the space 212, collides with the inner wall of the side portion 210 defining the rotation space 212 so as to be rotated with a direction opposite to the point of inflow and then be rotatably ejected through the ejection opening 102 positioned on an upper end of the center portion of the rotating space 212. The water ejected through the ejection opening 102 is maintained in a constant rotational state even when it is moved out of the ejection opening 102 due to the rotational inertia. This rotation causes the ejected water to be dispersed. Thus, the water is dispersed and falls down into a very wide area as compared with the case where water is ejected without rotation. In addition, the rotation of the ejected water allows the size of the water particles to be uniformly and finely formed. Therefore, according to the oozing hose of the present invention, in addition to the effect of expanding the range of water dispersion, the water can be formed into fine particles having a very small diameter thereof, thereby providing an effect of irrigating the plants.

The rotational force applying passage 214 may be formed with two or more (preferably symmetrically) with respect to the center of the rotating space. When the rotational force applying passage 214 is formed in a single type, rotation of the water flowing into the rotating space is varied depending on the distance from the center portion of the rotating space on its orientation, and thus the effects of the rotation and dispersion occur. When two or more rotational force applying passages 214 are formed, a dispersion effect is further generated due to collision between two or more water streams flowing into the rotating space. An ejected pattern of the water ejected through the ejection opening can be changed depending on the dispersion effect of the water and the degree of the dispersion effect due to the collision.

Further, as shown in the drawings according embodiments to be described below, the rotation generator 200 may further include a filter 220 provided with a filtering bole 222 for filtering water flowing into the rotation force applying passage 214 from the inner space 104. An interval between the side portion 210 and the filter 220 can be appropriately determined in consideration of, e.g., pressure of water to be ejected. The filter 220 may include a plurality of protrusions extending to an upper portion thereof in a predetermined shape for forming the filtering hole 222 from the bottom portion 240. The water may be filtered through the filtration boles 222 to flow into the rotating space 212.

Figure 4:
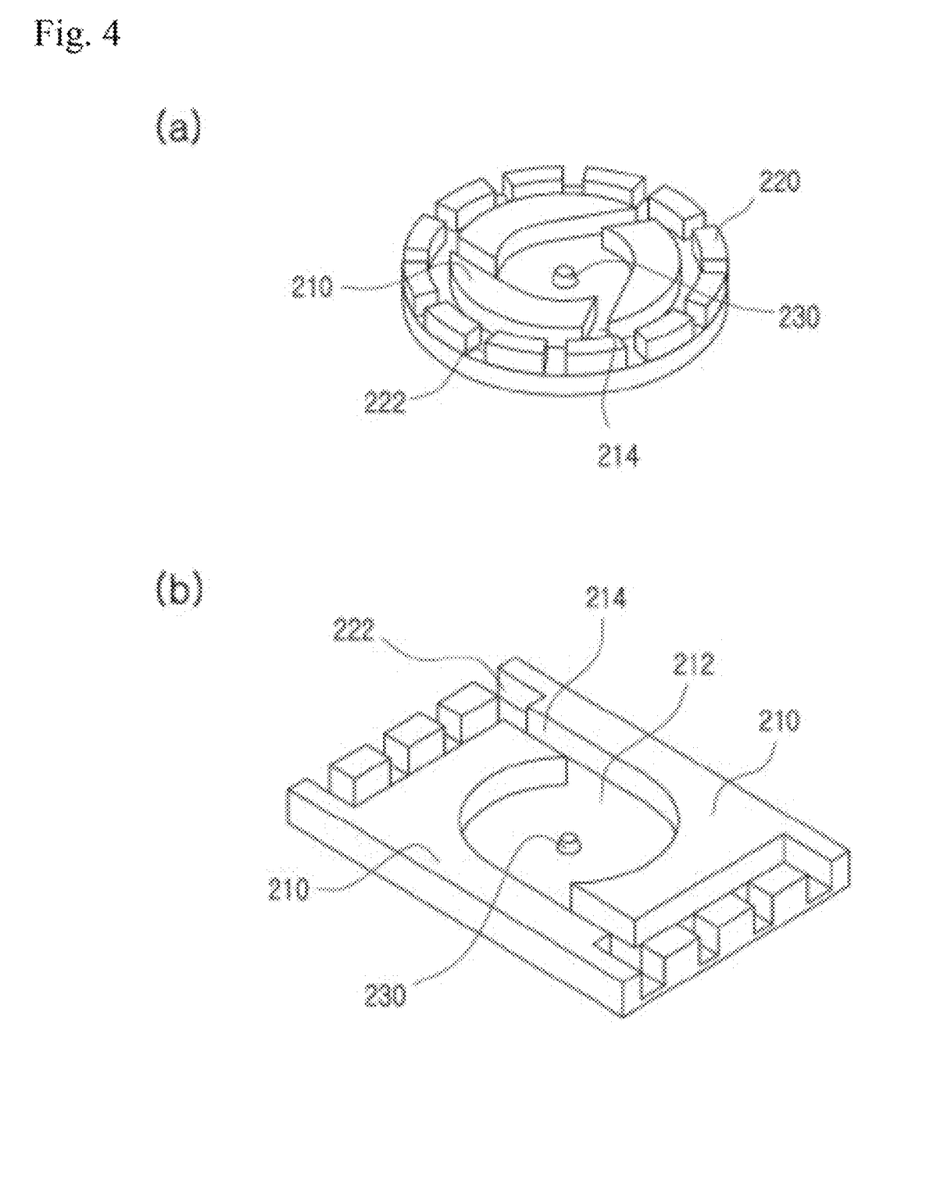
FIG. 4 is a perspective view illustrating two exemplary embodiments for a chip-type rotation generator according to a first embodiment of the present invention.

As shown FIG. 4, in an embodiment of the present invention, the rotation generator 200 may further comprise an ascending force reinforcement protrusion 230 on the bottom portion 240 corresponding to the central portion of the rotating space 212 so that an ascending force of water rising to the ejection opening 102 can be further reinforced while the water is rotated in the rotating space 212. The ascending force reinforcement protrusion 230 may be preferably formed in a tapered shape having a narrower width toward an upper side thereof. Accordingly, the water to be rotated in the rotation space 212 may be lifted more rapidly toward the ejection opening 102 to be ejected. The rotational force is still maintained in the water passed through the ejection opening 102 so that the water falls and is dispersed into a wide area.

Figure 5:
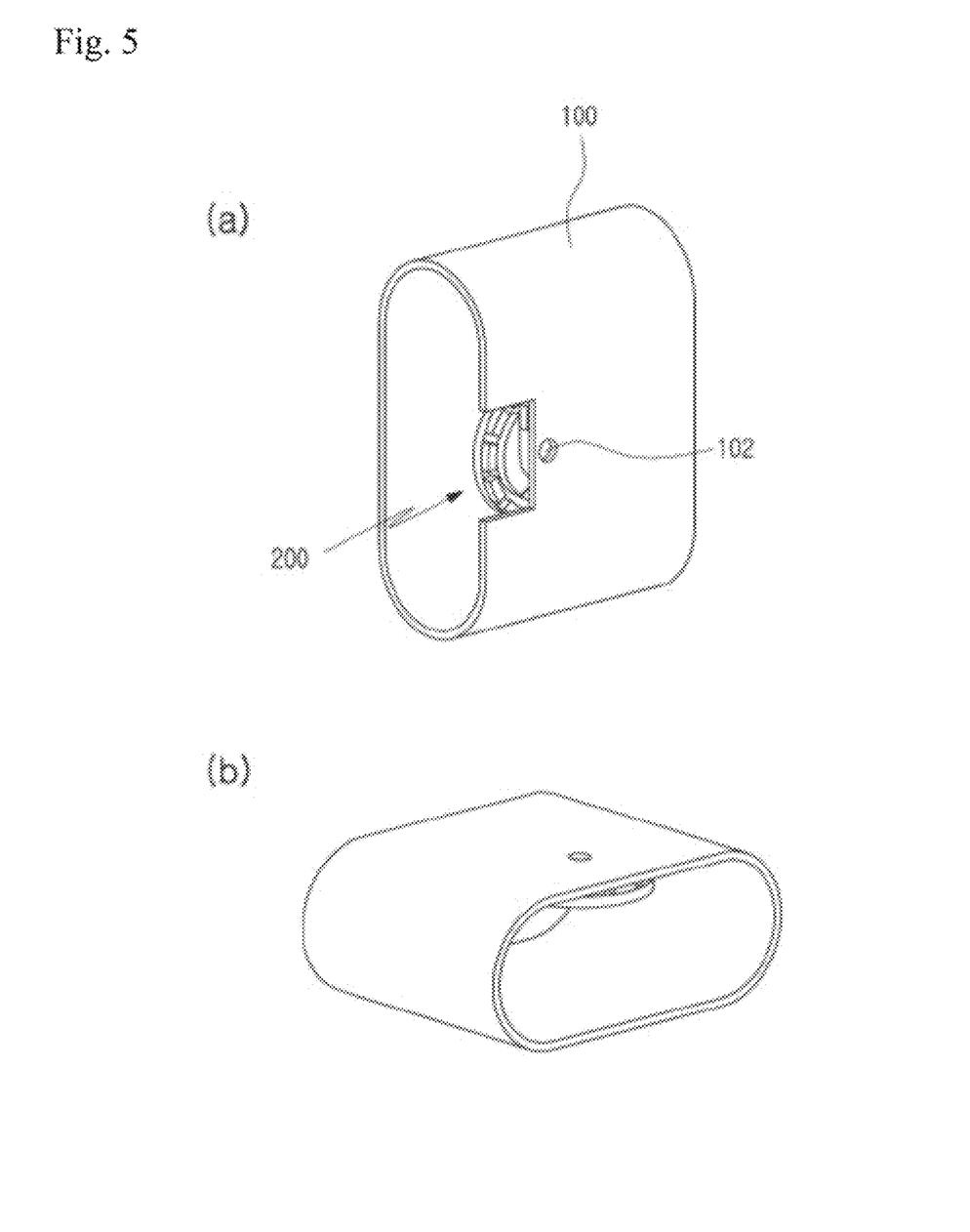
FIG. 5 is a partially sectioned view illustrating a shape of an oozing hose in which the rotation generator of FIG. 4 is formed.

FIG. 4 is a perspective view illustrating two exemplary embodiments for a chip-type rotation generator according to a first embodiment of the present invention. FIG. 5 is a partially sectioned view illustrating a shape of an oozing hose in which the rotation generator of FIG. 4(*a*) is formed. FIG. 5(*a*) is a more incised sectioned view of a corresponding part for showing a configuration in which the rotation generator is formed. FIG. 5(*b*) is a sectioned view of the hose only in the transverse direction. As shown in FIGS. 4 and 5, in the rotating ejection type oozing hose for plant cultivation according to one embodiment of the present invention, the rotation generator 200 may be formed in a chip-type having various outer shapes to be attached to the inner surface of the hose 100 at each ejection opening 102. FIG. 4(*a*) illustrates an example having a circular outer shape, and FIG. 4(*b*) shows an example having a quadrangular outer shape. A shape of the filter 220 additionally included can be differently configured depending on the outer shape of the rotation generator 200.

When the rotation generator 200 is formed in a chip-type, a plurality of chips having uniform shape and size, e.g., a size and shape of the rotating space, a width and length of the rotation force applying passage 214, a thickness of the filter, and a width of the filtering hole, may be prepared, and then the prepared chips may be attached to the inner wall of the hose 100 at constant interval during the manufacturing process of the hose 100. The ejection opening 102 can be formed before or after the chip is attached to the hose 100. However, for convenience of manufacture, after attachment of the chip, the outer surface of the hose 100 corresponding to the upper end of the central portion of the rotating space 212 may be preferably pierced to form the ejection openings 102 in order.

Further, in the present embodiment, although only one rotational force applying passage 214 is provided, the rotational force may be applied to the water flowing into the rotating space 212 by its orientation. Preferably, two or more rotational force applying passages 214 formed to be oriented in the same rotational direction from each other with respect to the center portion of the rotating space 212 can reinforce the rotational force by making the flow of the water circulating in the rotating space 212 have an orientation and converge to the center portion of the rotating space 212. The number of rotational force applying passages may be appropriately selected depending on the embodiments of the rotation generator.

In the first embodiment, as a preferable embodiment, the rotation generator 200 of a circular chip-type having three rotational force applying passages 214 is shown in FIG. 4(*a*), and as other preferable embodiment, FIG. 4(*b*) shows the rotation generator 200 of a square chip-type having two rotational force applying passages 214 are provided. As shown in FIG. 4(*a*), when the chip-type rotation generator 200 has a circular miter shape, three or more rotational force applying passages 214 are easily provided in a symmetrical configuration.

Figure 12:
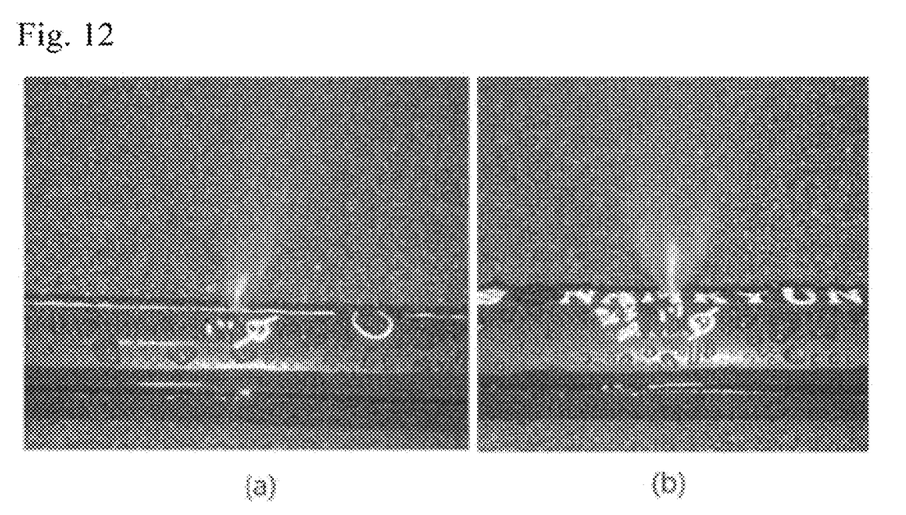
FIG. 12 is a view showing a water stream ejected from an oozing hose according to the present invention.

When the rotational force applying passages 214 are formed of two or more as described above, and an orientation thereof is directed to a point near the center of the rotational space 212, the water streams flowing into the space 212 through the rotational force applying, passages 214 are collided with each other although their directions are shifted from each other. In this case, the effect of dispersing the water by the collision between two or more water streams may also occur as well as the effect of dispersing the water by the rotation. FIG. 12(*a*) shows a state in which water is spouted when the rotation and the collision occur simultaneously in the rotating space 212. FIG. 12(*b*) illustrates a state of spraying water when the rotation is dominant. Although the appearances of the ejection may seem to be different from each other, both have almost the same aspect in terms of the dispersed range. Therefore, in contrast with a single rotational force applying passage 214, when two or more rotational force applying passages 214 are provided, the orientation of the rotational force applying passages 214 may be less important.

Figure 6:
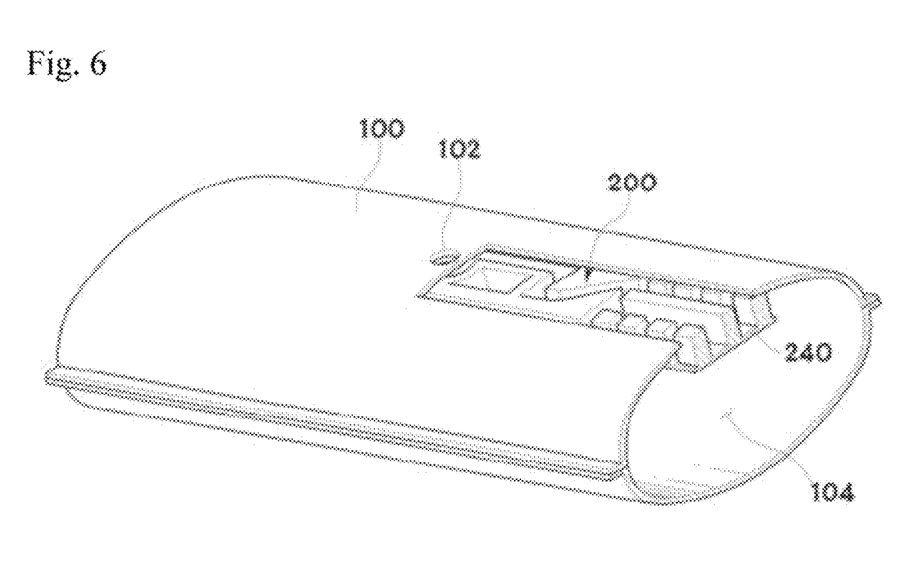
FIG. 6 is a partially sectioned view showing a band-type rotation generator according to a second embodiment of the present invention and an oozing hose including the same.

FIG. 6 is a partially sectional view showing shapes of a band-type rotation generator and an oozing hose including the same according to the second embodiment of the present invention. As shown in FIG. 6, in other embodiment of the present invention, the rotating ejection type oozing hose for plant cultivation is provided with a plurality of the rotation generator 200 arranged in a row in one hand. The upper surface of the side portion 210 of the rotation generator 200 may be attached to the inner surface of the hose 100.

Figure 7:
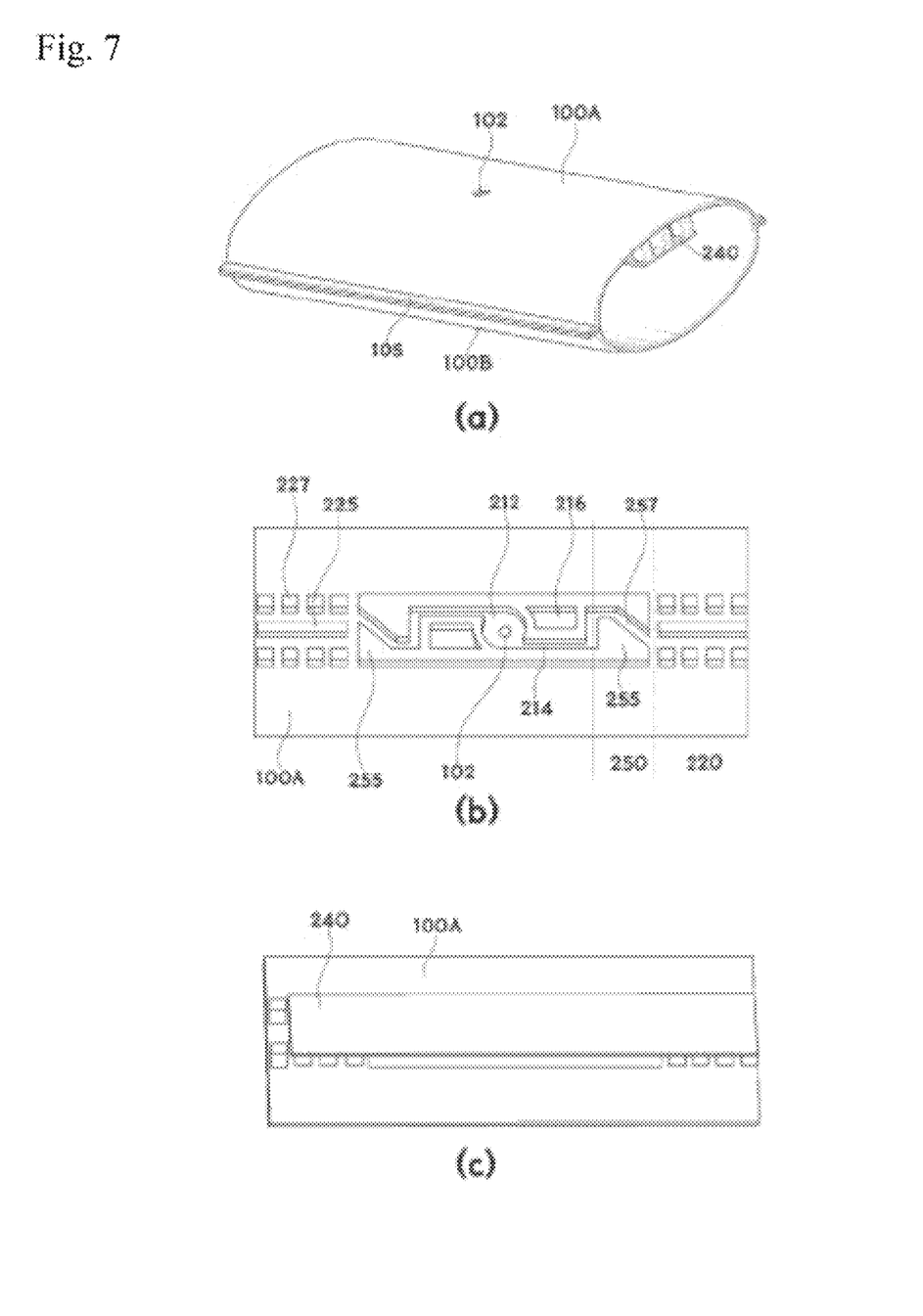
FIG. 7 shows a partially sectioned perspective view (a) illustrating a band-type rotating ejection type oozing hose prepared according to the second embodiment of the present invention, a partially sectioned perspective view (b) illustrating a developed portion of a patterned upper end of the hose, and a partially sectioned perspective view (c) illustrating a state in which a bottom member is attached to the upper end of the hose.

Herein, as shown in FIG. 7(*b*), a decompressor 250 having a decompression path 257 with at least one bends may be further included for adjusting the water pressure of the water flowing into the rotational force applying passage 214. The bending path of the decompressor 250 is defined by a decompression wall 255 formed to be connected to an outer end of the rotational force applying passage 214 along the bending path. The drawings illustrate an example in which the number of bends of the decompression path 257 is one. However, for the desired irrigation characteristics, two or more bends can be formed, and a shape or form of the bends can be variously configured.

As shown in FIG. 7(*b*), when the oozing hose of the second embodiment includes the decompressor 250, the filter 220 is configured to be positioned outside the decompressor 250, filtering water flowing into the decompressor 250 from the inner space 104 of the hose 100.

In contrast with the first embodiment in which the filter 220 is configured to enclose the rotating space 212, the filter 220 of the second embodiment is configured in the form of two lines to filter the incoming water. When a distance between the two lines is large, the hose of soft material may sink to block the waterway. In order to address such issue, a structural maintaining rib 225 is formed between the two lines in a longitudinal direction to keep the height of the inflowing space sufficiently high, and thus water flows smoothly.

As described above, the oozing hose for plant cultivation according to the second embodiment can be prepared by various manufacturing processes. Two examples may include a band pattern scheme shown in FIG. 7 and a molding band bonding scheme shown in FIG. 8.

First, FIG. 7 shows a partially sectional perspective view (a) illustrating the oozing hose for plant cultivation including the band-type rotation generator 200 prepared according to a pattern forming scheme of the second embodiment, a partially sectional perspective view (b) illustrating an incised part of a patterned upper hose portion, and a partially sectional perspective view (c) illustrating a state in which a bottom member is attached to the upper hose portion.

Figure 8:
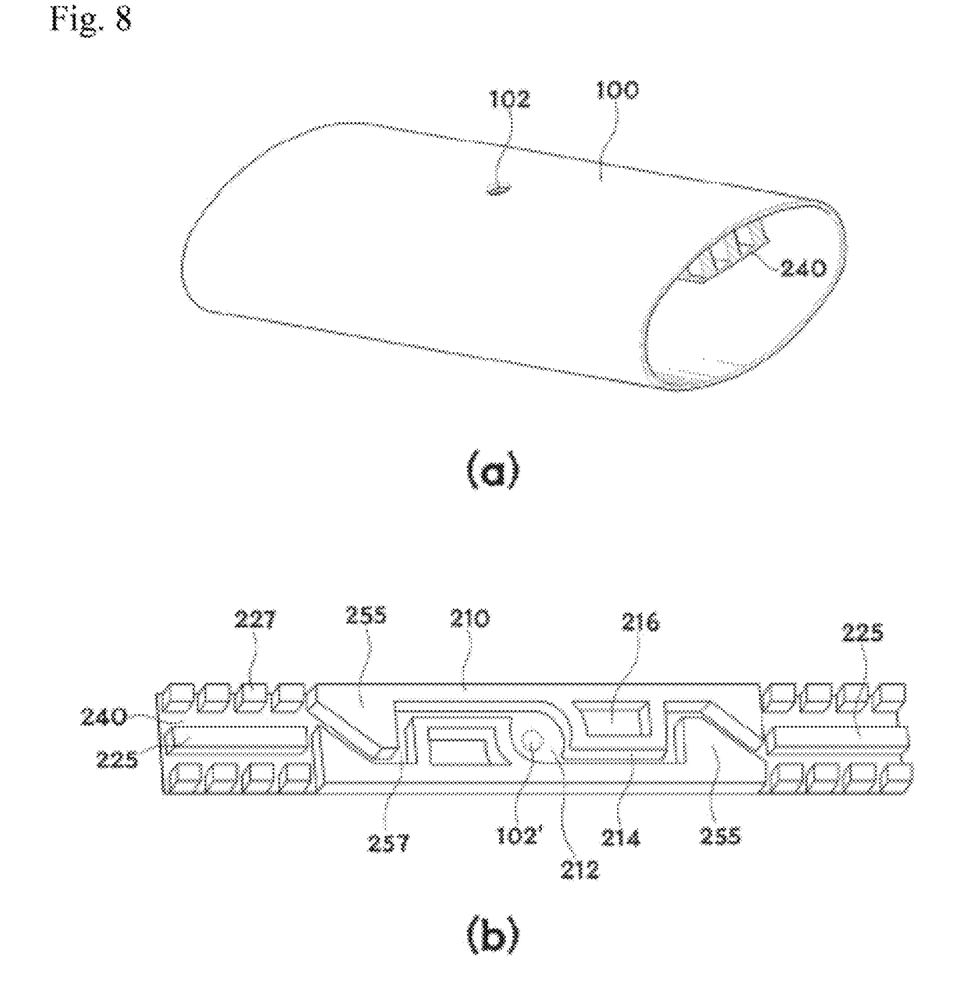
FIG. 8 shows a partially sectioned perspective view (a) of a band-type rotating ejection type oozing hose prepared according to the second embodiment of the present invention and according to a molding band bonding method and a perspective view (b) of a molding band.

For forming the rotation generator 200 as described above including a side portion 217, a decompression wall 255, and the filtering hole 222, one side of a synthetic resin film to be formed in the upper hose portion 100A is provided with a predetermined pattern in which a filtering protrusion 227 is protruded. Such pattern including the protrusion can be formed by various conventional pattern forming devices. FIG. 7(b) shows such protrusion pattern formed. In the drawing, the ejection opening 102 is formed at the center portion of the rotating space 242 and may be formed by a punching scheme after the pattern is formed. Referring to FIG. 8, in contrast with the molding band binding scheme as described below, since the opening can be formed on the basis of the pattern after the pattern formation, the opening can be pierced at a more accurate position.

Next, as shown in FIG. 7(c), the upper surface of the protrusion pattern is prepared, and then the upper hose portion 100A is completely prepared by covering the upper surface of the protrusion is pattern with a band member corresponding to the bottom portion 240. Finally, the upper hose portion 100A having the pattern is fused with a lower hose portion 100B having no pattern to produce the oozing hose according to one embodiment of the present invention as shown in FIG. 7(a).

Next, FIG. 8 includes a partially sectional perspective view (a) illustrating the oozing hose for plant cultivation including the band-type rotation generator produced according to a molding band bonding method according to other embodiment of the present invention and a perspective view (b) illustrating the molding band including the rotation generator. According to the molding band bonding method, the oozing hose is prepared by a general molding method, an injection molding for one molding band including all elements, for example, the side portion 217, the decompression wall 255, and the filtering projection 227 provided in the rotation generator 200 as shown in FIG. 8(b). However, since the decompression wall 255 for forming the decompressor 250 or the filtering protrusion 227 for forming or the filter 220 is not an important component in the present invention, the molding band may be prepared without those components.

Herein, such elements are formed on one bottom portion 240 to be configured in a form of one continuous band, Next, it may be prepared by the scheme that the formed molding band is pushed inside the hose when it is melt-extruded and formed into the cylindrical hose so that the band is attached to one side of the hose. In this case, the molding band is attached to the inner surface of the hose to be discharged, and after cooling, the ejection opening 102 is formed at the center of the rotating space by punching. In FIG. 8(b), a dotted circle 102' indicates a position of the molding band corresponding to the ejection opening 102.

Figure 9:
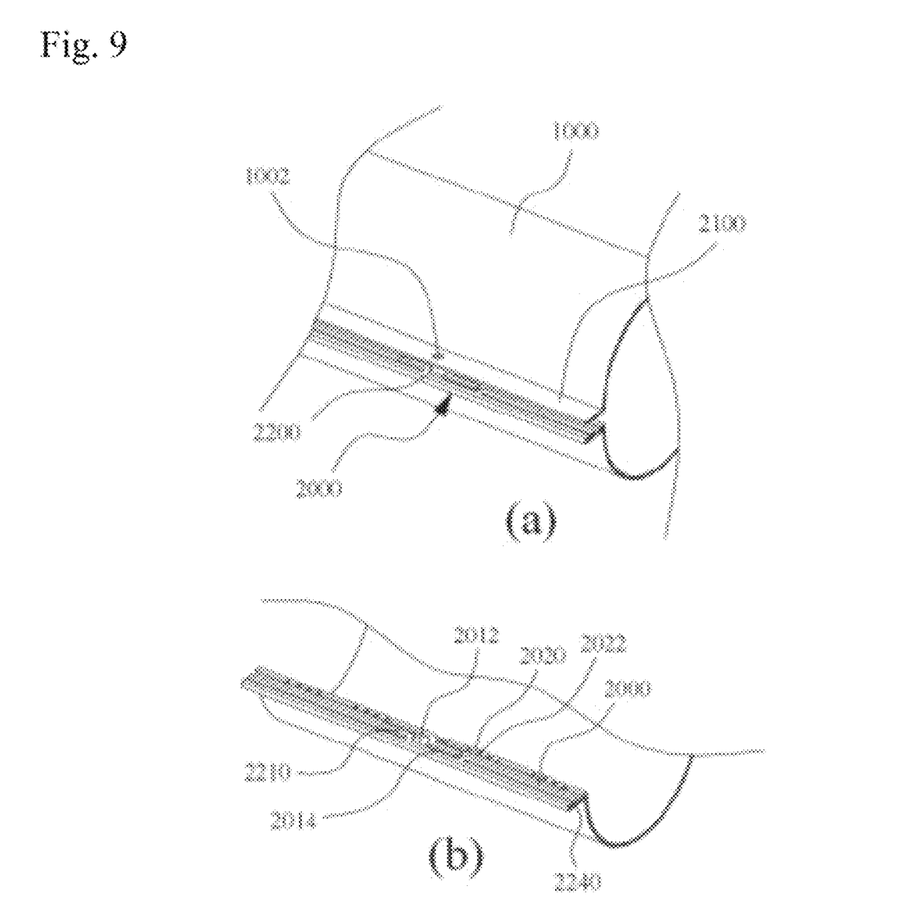
FIG. 9 is a view illustrating an embodiment of an oozing hose provided with a protruding rib including a rotation generator according to a third embodiment of the present invention.

FIG. 9 is a view illustrating an embodiment of the oozing hose provided with a protruding rib including the rotation generator according to the third embodiment of the present invention. As shown in FIG. 9, according to other embodiment of the present invention, a rotating ejection type oozing hose for plant cultivation comprises a hose body 1000 having a cylindrical shape and a protruding rib 2000 protruding from a surface of the hose body 1000 to an outside thereof along a longitudinal direction of the hose body 1000.

The protruding rib 2000 may be formed on one side or both sides of the hose body 1000 along a longitudinal direction thereof. As shown in FIG. 7, when the hose body is formed by mutual fusion of an upper hose portion and a fused protrusion formed at an edge of the lower hose portion, each protruding rib may be formed on both sides of the hose body.

Further, the protruding rib 2000 comprises an upper rib 2100 provided with an ejection opening 1002 formed at an interval along a longitudinal direction of the protruding rib 2000 and a rotation generator 2200 formed at the ejection opening 1002 for applying a rotational force to a flow of water ejected from an inner space 1004 of the hose body 1000 to an outer space 1006 thereof. When the protruding rib 2000 is formed in two or more lines on the outer surface of the hose body 1000, the rotation generator 2200 may be formed on at least one line of the lines.

It is the same as in the above embodiments that the rotation generator 2200 comprises a barrel-shaped rotating space 2012 extended from the ejection opening 1002 and formed inside the upper rib 2100, and the rotating space 2012 is defined by a side portion 2210 and a bottom portion 2240, the side portion 2210 formed to be extended from an inner wall of the upper rib 2100 and having a rotational force applying passage 2014 which is a horizontal passage to supply water flowing into an inner space 1004 of the hose body 1000 to rotating space 2012, and the bottom portion 2240 for closing a lower end of the side portion 2210.

Further, the rotational force applying passage 2014 is oriented to face a paint deviating from a center portion P of the rotating space 2012, supplying a rotational force to a flow of water flowing into the rotating space 2012 through the rotational force applying passage 2014, and such mechanism is the same as in the above embodiments.

Herein, the rotation generator 2200 may further comprise a filter 2020 provided with a filtering hole 2022 for filtering water flowing into the rotational force applying passage 2014 from the inner space 1004. Further, the rotation generator 2200 may further comprise an ascending force reinforcement protrusion formed on the bottom portion 2240 corresponding to the center portion of the rotating space 2012, more reinforcing an ascending force of water ascending to the ejection opening 1002 while rotating in the rotating space 2012. Since such configurations are described in the embodiments as described above, the description is excluded.

Figure 10:
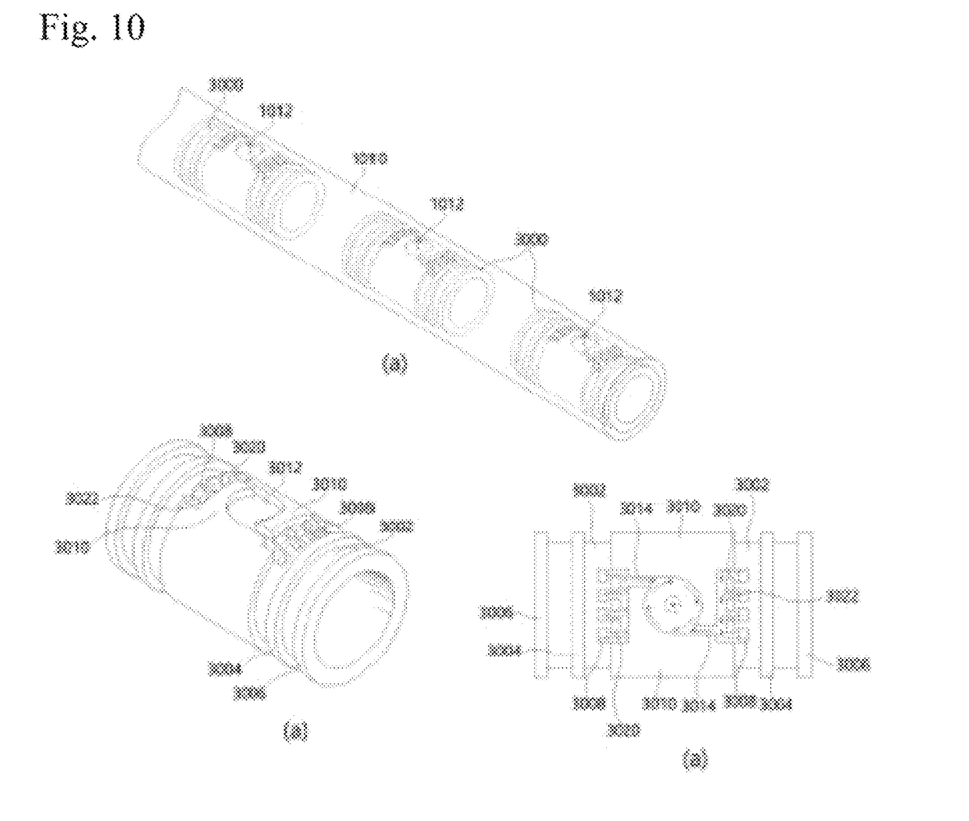
FIG. 10 is a view illustrating an embodiment of an oozing hose including a tube-type rotation generating device according to a fourth embodiment of the present invention.

FIG. 10 is a view illustrating an embodiment of the oozing hose including the tube-type rotation generating device according to the fourth embodiment of the present invention. Referring to FIG. 10, a tube-type rotation generating device 3000 is constituted by a tubular body and includes a rotation generator on an outer surface of the tubular body, and the rotation generator applies a rotational force to a flow of water ejected from an inner space of the hose to an outer space thereof. The rotation generator includes a rotating space 3012 having a predetermined height and formed inside the hose 1010 below an ejection opening 1012 and a blocking wall 3010 provided with a rotational force applying passage 3014 which is a passage in the horizontal direction for horizontally moving water flowing into the inner space of the hose 1010 to the rotating space 3012. Further, the rotational force applying passage 3014 is oriented toward a point spaced apart from a center portion of the rotating space 3012 to generate a rotational force in water flowing into the rotating space 3012 through the rotational force applying passage 3014.

Further, the rotation generating device 3000 may further comprise extending portions 3002 formed with inflow holes 3008 on both sides of the rotation generator. Water flowing from the inner space of the hose through the inflow hole 3008 may flow into the rotation space 3012. A fixing protrusion 3006 for fixing the tubular body to the inside of the hose may be formed at an end of the extension 3002 in a ring shape on an outer circumferential surface of the tubular body.

Further, in the extending portion 3002, an anti-clogging portion 3004 for preventing dogging of the inflow hole 3008 may be further formed on the outer surface of the tube in a ring shape. When a length of the extending portion 3002 is increased to fittingly fasten the tubular body to the inner surface of the hose more strongly, a distance between the blocking wall 3010 of the rotation generator and the fixing protrusion 3006 lengthens, and thus the hose covering the same may sink downward or expand to the outside of the hose so that the inflow hole 3008 may not perform its role. Such issue may be addressed by the anti-clogging portion 3004.

Further, the rotation generating device 3000 may further comprise a plurality of filtering walls 3020 at an inlet side of the rotational force applying passage 3014 formed at one side or both sides of the rotation generator. Thus, water may be filtered through a filtering hole 3022 between the filtering walls 3020 and then flow into the rotating space 3012.

Figure 13:
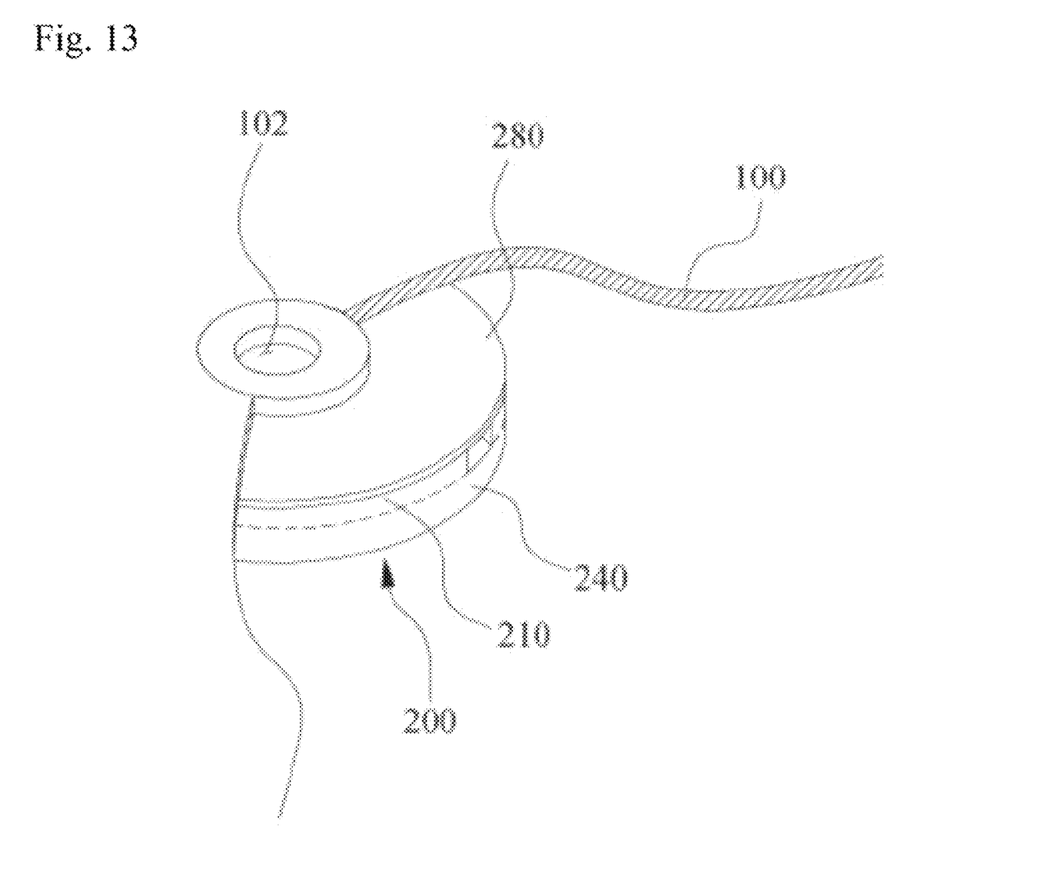
FIG. 13 is an exemplary view showing other configuration of an ejection opening of an oozing hose of the present invention.

Further, in the above description of the present invention, the rotation generating device 200 extended from the ejection opening 102 is attached to the inner surface of the hose 100 in FIG. 1, but the present invention is not limited thereto, and (unless the convenience of practical production is considered) the present invention may be formed integrally with the hose. Further, it is described that the hose 100 may cover the rotating space 212 of the rotation generating device 200. However, instead of such configuration, as shown in FIG. 13, the rotation generating device 200 comprises a cover 280 provided with a through-hole, and the cover 280 may be exposed on the surface of the hose 100 so that the rotated water in the rotating space can be directly ejected outside through the through-hole. Herein, the through-hole performs its role corresponding to the ejection opening 102 as described above.

Although the preferable embodiments of the present invention are shown and described, the present invention is not limited to the particular embodiments as described above. Various modifications may be made by those skilled in the art without departing from the scope of the present invention as claimed by the appended claims. Although details that may be easily inferred from the accompanying drawings are not specifically described in the detailed description, it should be understood to be included within the context of the present invention. Various modifications should not be understood independently from the technical spirit or concept of the present invention.

What is claimed is:

1. A rotating ejection type oozing hose for plant cultivation, comprising a rotation generator (200) formed at an ejection opening (102) formed at an interval along a longitudinal direction of a hose (100), applying a rotational force to a flow of water ejected from an inner space (104) of the hose (100) to an outer space (106) thereof,
   wherein the rotation generator (200) comprises a barrel-shaped rotating space (212) extended from the ejection opening (102) and formed inside the hose (100),
   wherein the rotating space (212) is defined by a side portion (210) and a bottom portion (240), the side portion (210) formed to be extended from an inner wall of the hose (100) and having a rotational force applying passage (214) horizontally connecting the inner space (104) of the hose (100) to the rotating space (212), and the bottom portion (240) for closing a lower end of the side portion (210),
   wherein the rotational force applying passage (214) is oriented to face a point deviating from a center portion (P) of the rotating space (212), applying a rotational force to a flow of water flowing into the rotating space (212) through the rotational force applying passage (214), and wherein the rotation generator (200) further comprises an ascending force reinforcement protrusion (230) formed on the bottom portion (240) corresponding to the center portion of the rotating space (212), the ascending force reinforcement protrusion (230) reinforcing an ascending force of water ascending to the ejection opening (102) while rotating in the inner space (212).

2. The rotating ejection type oozing hose of claim 1, wherein the rotation generator (200) further comprises a filter (220) provided with a filtering hole (222) for filtering water flowing into the rotational force applying passage (214) from the inner space (104).

3. The rotating ejection type oozing hose of claim 1, wherein the rotation generator (200) is formed in a chip-shape to be attached to an inner surface of the hose (100) at the ejection opening (102).

4. The rotating ejection type oozing hose of claim 3, wherein two or more rotational force applying passages (214) are formed to be oriented in the same rotational direction at a predetermined interval therebetween with respect to the central portion of the rotational space (212).

5. The rotating ejection type oozing hose of claim 1, wherein a plurality of rotation generators (200) are formed in a line in one band, and wherein an upper surface of the side portion (210) of each rotation generator (200) is formed to be attached to an inner surface of the hose (100).

6. The rotating ejection type oozing hose of claim 5, further comprising a decomposer (250) having at least one bending path for adjusting a pressure of water flowing into the rotational force applying passage (214).

7. The rotating ejection type oozing hose of claim 2, wherein the rotation generator (200) is formed in a chip-shape to be attached to an inner surface of the hose (100) at the ejection opening (102).

8. The rotating ejection type oozing hose of claim 2, wherein a plurality of rotation generators (200) are formed in a line in one band, and wherein an upper surface of the side portion (210) of each rotation generator (200) is formed to be attached to an inner surface of the hose (100).

* * * * *